(12) United States Patent
Ibrahim et al.

(10) Patent No.: US 12,450,821 B2
(45) Date of Patent: Oct. 21, 2025

(54) METHOD AND A SYSTEM FOR BOUNDING VOLUME HIERARCHY APPROXIMATION

(71) Applicant: HUAWEI TECHNOLOGIES CO., LTD., Shenzhen (CN)

(72) Inventors: Mohamed Ibrahim Hafez Ibrahim, Mississauga (CA); Jatinder Singh Bhachu, Brampton (CA); Yang Liu, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 18/516,077

(22) Filed: Nov. 21, 2023

(65) Prior Publication Data

US 2025/0166279 A1  May 22, 2025

(51) Int. Cl.
*G06T 15/06* (2011.01)
*G06T 15/50* (2011.01)
*G06T 17/00* (2006.01)
*G06T 17/20* (2006.01)

(52) U.S. Cl.
CPC ............ *G06T 15/06* (2013.01); *G06T 15/506* (2013.01); *G06T 17/005* (2013.01); *G06T 17/20* (2013.01); *G06T 2210/12* (2013.01)

(58) Field of Classification Search
CPC ..... G06T 15/06; G06T 15/506; G06T 17/005; G06T 17/20; G06T 2210/12
USPC ......................................................... 345/426
See application file for complete search history.

(56) References Cited

U.S. PATENT DOCUMENTS

| | | | |
|---|---|---|---|
| 11,450,059 B1* | 9/2022 | Morrical | G06T 15/06 |
| 2016/0034248 A1* | 2/2016 | Schissler | H04R 27/00 381/17 |
| 2016/0292908 A1* | 10/2016 | Obert | G06T 15/005 |
| 2022/0292760 A1* | 9/2022 | Muthler | G06T 15/06 |
| 2022/0392160 A1* | 12/2022 | Hasselgren | G06T 17/20 |
| 2023/0298127 A1* | 9/2023 | Barczak | G06T 1/60 345/531 |
| 2023/0298255 A1* | 9/2023 | Benthin | G06T 15/06 345/426 |
| 2024/0087211 A1* | 3/2024 | Muthler | G06T 15/06 |

OTHER PUBLICATIONS

Hendrich J., Pospíšil A., Meister D., Bittner J.: Ray Classification for Accelerated BVH Traversal. Computer Graphics Forum 38, 4 (2019), 49-56.*

* cited by examiner

*Primary Examiner* — Jin Ge
(74) *Attorney, Agent, or Firm* — BCF LLP (57) ABSTRACT

A method and system for traversing a bounding volume hierarchy (BVH) structure associated with a given 3D scene using a ray tracing algorithm are provided. The method comprises: determining an escape probability value for a given node of the BVH structure of a given ray traversing the given node without reflecting off any mesh element contained therein; propagating a ray in the given 3D scene that intersects the respective bounding volume of the given node; in response to determining that the ray is to traverse the respective bounding volume, determining whether the ray is to traverse or to reflect off an other respective bounding volume; and in response to determining that the ray is to reflect off the respective bounding volume: rendering a mesh element contained in the respective bounding volume of the given BVH node.

20 Claims, 6 Drawing Sheets

METHOD AND A SYSTEM FOR BOUNDING VOLUME HIERARCHY APPROXIMATION

FIELD

The present technology relates to indirect (or otherwise global) illumination techniques for rendering 3D scenes; and in particular, to systems and methods for bounding volume hierarchy (BVH) approximation.

BACKGROUND

A gaming application is a software program that provides users with the ability to play games on electronic devices such as smartphones, tablets, and personal computers. "Game apps" often include features such as leaderboards, social networking integration, and in-app purchases and include a user interface allowing the user to play and interact with rendered visual content.

Rendering of visual content refers to the process of creating and displaying graphics on a screen in real-time. This process involves generating and rendering 3D models, textures, lighting, and other effects to create a realistic and immersive gaming experience for the user. Rendering can involve the use of a graphics engine, which is a software framework that provides the tools and algorithms needed to render the visual content.

Indirect (or global) illumination techniques have been one of industry standards for producing realistic renderings of three-dimensional (3D) scenes, for example, in gaming applications. These techniques mimic physical interactions of light rays with 3D objects in a given 3D scene to produce plausible, high-quality, physically accurate renderings. When augmented with methods of Physically Based Renderings (PBR), ray tracing techniques produce rendered images of comparable quality to real scene photographs. Even though ray tracing techniques produce realistic renderings, their high computational cost may make them inefficient to use in real-time rendering applications.

Therefore, certain algorithms have been developed to improve different components of ray tracing algorithms to produce quality renderings at interactive rates. Some algorithms aim to replace entire components of the global illumination pipeline, such as a Screen-Space Ambient Occlusion (SSAO) algorithm, configured to replace ambient occlusions; a Shadow Mapping algorithm, configured to replace shadow ray computations; and a Screen-Space Reflections (SSR) algorithm, configured to replace computing reflections using ray tracing.

Also, there are known in the art other algorithms that aim to accelerate different components of the global illumination pipeline such as a spatiotemporal reservoir resampling (ReStir) algorithm (disclosed in "*Spatiotemporal Reservoir Resampling for Real-time Ray Tracing*" by Bitterli et al., 2020) for direct light computations, occlusion culling and approximating bounding volume hierarchies (BVH) to accelerate the traversal of 3D scenes.

In the context of the present specification, the BVH denotes a tree structure representative of the given 3D scene that is used in ray tracing. More specifically, each node of the BVH includes a bounding volume, such as an axis-aligned bounding box (AABB), a sphere, and the like, that includes a respective portions of mesh elements (such as triangles) defining surfaces of digital objects of the given 3D scene to be rendered. Thus, using the BVH, it may be possible to optimize a number of digital objects (or mesh elements thereof) to be traversed by omitting those mesh elements that are located in bounding volumes which are not intersected by a current ray. However, there are known in the art approaches directed to further optimizing how the bounding volumes are to be traversed in the BVH, which are referred to herein as "BVH approximation approaches."

One of the BVH approximation approaches includes an article entitled "*Fast Insertion—Based Optimization of Bounding Volume Hierarchies*," authored by Bittner et al., and published in Computer Graphics Forum in January 2013, discloses 'subtree collapsing', that is, collapsing entire subtrees of a give BVH into a larger leaf based on predefined metrics. This may result in less memory consumption and less traversal time during rendering.

Further, an article entitled "*A Survey on Bounding Volume Hierarchies for Ray Tracing*," authored by Meister et al., and published in Computer Graphics Forum in June 2021, discloses approximating the scene primitives by a single point, or approximating a child's bounding volume in the given BVH by trimming the parent's bounding volume by one or two parallel planes thus reducing the cost of storing the bounding volume extents in each node.

Further, an article entitled "*Multi-Resolution Geometric Representation using Bounding*," authored by Ikeda et al., and published in GPUOpen technical report in February 2022, discloses a view cone heuristic to decide whether early BVH traversal termination is possible without affecting the rendering quality or not.

However, although the above-mentioned prior art approaches may allow saving computational resources on rendering 3D scenes, they do not consider the quality of a final result of such rendering. In other words, effective approximation of the BVH of the given 3D scene may cause a low rendering accuracy thereof, such as that of the indirect light, which may result in the given 3D scene appearing less realistic, not corresponding to an initial artistic intent. This may affect the user experience of the user presented with such 3D scene.

Thus, there is a need in the art for a rendering solution that would allow balancing these contrasting requirements: reducing a number of bounding volumes to be traversed in the BVH, thereby saving the computational resources of a processor and/or a GPU for rendering the given 3D scene; however, without affecting the rendering accuracy thereof.

SUMMARY

Developers have devised methods and devices for overcoming at least some drawbacks present in prior art solutions.

Figure 2:
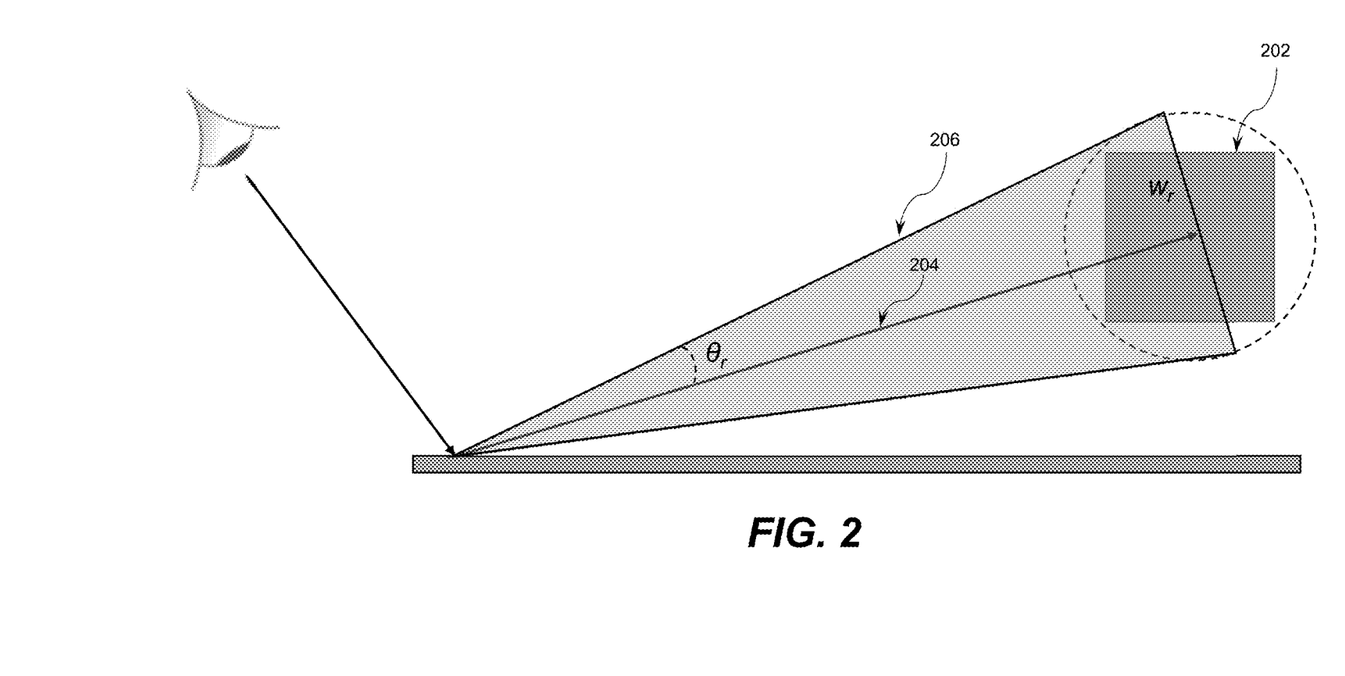
FIG. 2 shows a schematic diagram of a prior art approach of executing a ray tracing algorithm to traverse a Bounding Volume Hierarchy (BVH) of a given 3D scene.

With reference to FIG. 2, there is depicted a schematic diagram of a prior art BVH approximation approach. More specifically, this prior art approach is based on a view cone heuristic defined by parameters $\theta_r$, $\omega_r$, based on which it may be determined whether a given node 202 (including a respective bounding volume of the BVH) can be approximated and therefore no further traversal of the BVH in a same traversing direction is required, and the mesh elements therefrom are sampled for further rendering, while the traversal of the BVH structure continues in a different direction.

In other words, if the given node 202 of the BVH is fully contained within a view cone 206 of the predetermined parameters defined along a current ray 204, the approach is directed to sampling (for example, uniformly), from the given node 202, mesh elements to be rendered, and the traversal of the BVH in the current direction terminates, resulting in the current ray 204 being reflected off the given node 202 for traversing the BVH in another direction. On the other hand, if the given node 202 is not fully contained within the view cone 206, the current ray 204 goes through (or otherwise escapes) the given node 202 to further traverse child bounding volumes positioned under that of in the given node 202 of the BVH in the same traversing direction. As it can be appreciated, results of applying such a BVH approximation approach are such that the larger the view cone 206 is, the lower a quality of a respective rendering of a given 3D scene is.

Figure 3A:
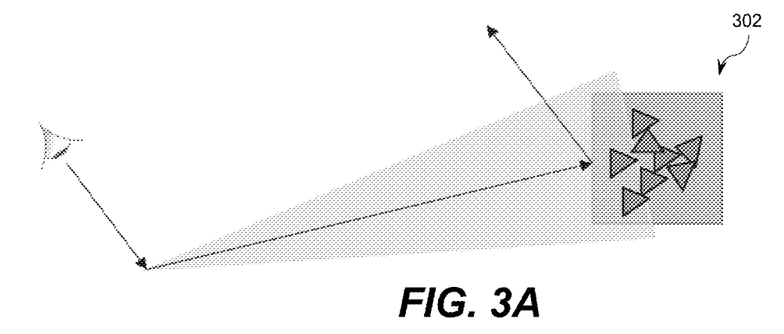
FIGS. 3A and 3B show a schematic diagram of how the prior art approach of FIG. 2 of executing the ray tracing algorithm is applied to different nodes of the BVH.
Figure 3B:
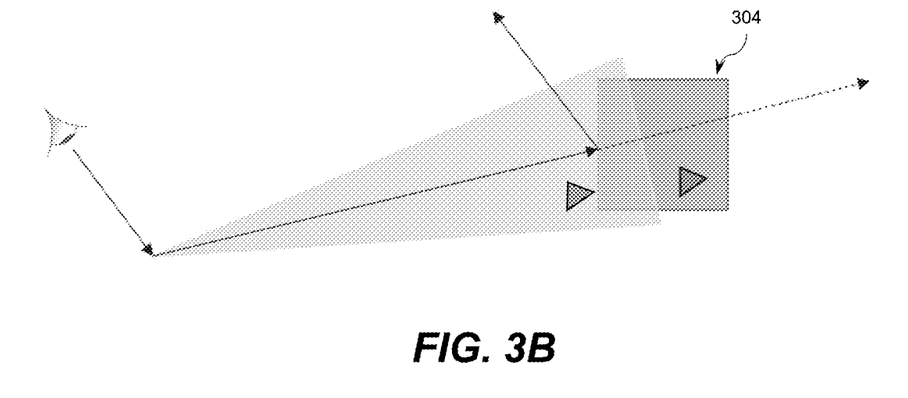

However, this approach, as considering only a size and a form of the bounding volume of the give node 202 of the BVH, can be associated with approximation errors. With reference to FIGS. 3A and 3B, there are depicted schematic diagrams of applying the prior art BVH approximation approach to different nodes of the BVH, containing different numbers of mesh elements.

More specifically, as schematically depicted in FIG. 3A, if a first node 302 contains a large number of mesh elements, the prior art BVH approximation would work very well by uniformly sampling, from first node 302, a given number of mesh elements to be rendered. However, if a BVH node contains a small number of mesh elements, as it is the case with a second node 304, depicted in FIG. 3B, although the ray should have escaped the second node 304 due to a sparsity of the mesh elements therein and the traversal of the BVH should have continued in the same traversing direction, as schematically depicted by a dashed arrow, according to the prior art approach, the mesh element would still be sampled for rendering, thereby causing the traversal to terminate, which results in approximation errors.

Figure 4:
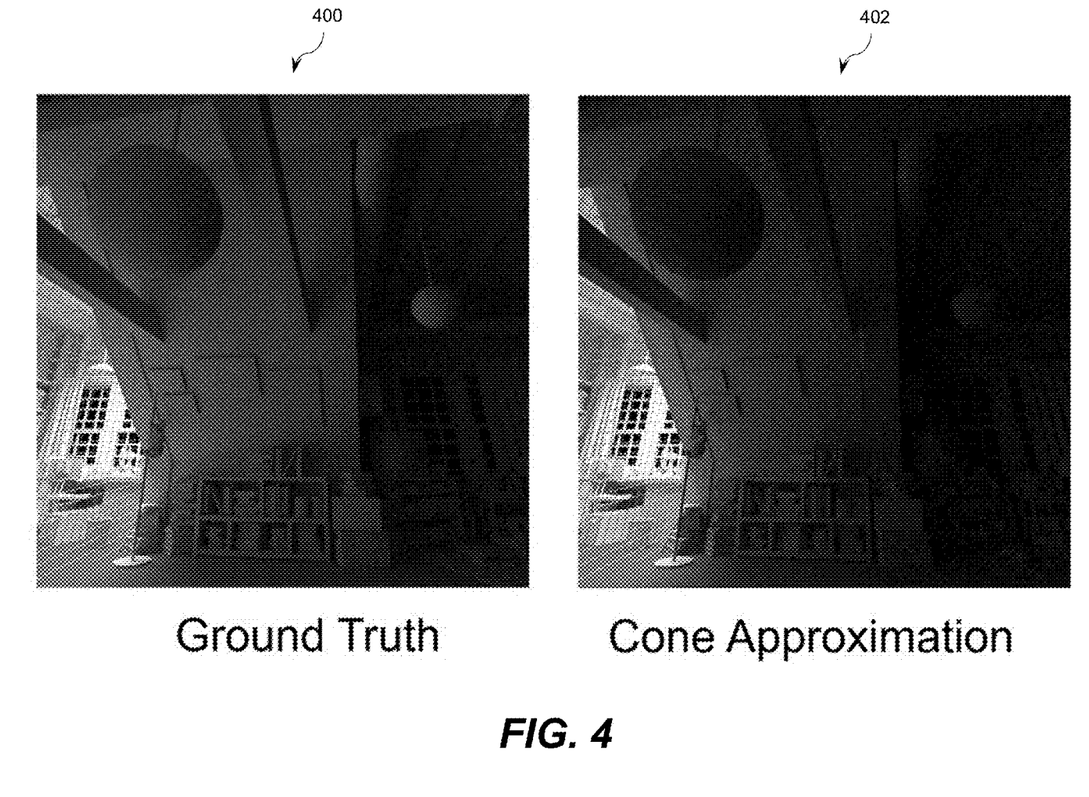
FIG. 4 shows schematic diagrams of the given 3D scene and a respective 3D image thereof rendered using the prior art approach of FIG. 2.

This issue becomes more apparent in 3D scenes primarily lit by indirect light. For example, as schematically depicted on FIG. 4 schematically illustrating a given 3D scene 400 and a rendered 3D image thereof generated by the prior art approach described above, since rays that should have 'escaped' certain BVH nodes in the given 3D scene 400, would instead be reflected therefrom, the prior art BVH approximation may cause a visually perceived unrealistic lighting of the rendered 3D image 402. This may cause discoloration of certain 3D objects in the rendered 3D image 402 relative to ground truth color and illumination values of these objects in the given 3D scene 400.

Thus, developers of the present technology have appreciated that the 3D scenes can be rendered more accurately if each node of the BVH had an additional parameter indicative of whether the current ray would reflect off or escape the given node 202. In other words, certain non-limiting embodiments of the present technology are directed to considering not only the size and form of the bounding volume of the BVH contained in the given node 202, but, unlike the prior art methods, also the content of the bounding volumes.

Thus, in case of high sparsity of mesh elements within the bounding volume, a probability value of the current ray escaping the bounding volume would be high. By contrast, if the bounding volume is "packed" with mesh elements, the probability value of the current ray escaping the bounding volume would be low. Consequently, according to at least some non-limiting embodiments of the present technology, this probability value, which is also referred to herein as "escape probability", can be pre-determined and stored in association with each node of the BVH prior to executing the ray tracing algorithm.

Thus, when executing the ray tracing algorithm, a decision whether to continue the traversal of the BVH with the current ray can be made, such that: (i) if a respective escape probability value associated with the given node 202 of the BVH is equal to or greater than a predetermined probability threshold value, the current ray continues traversing the BVH, that is, the traversal continues in the same traversing direction; (ii) else, the current ray bounces off the given node 202, thereby terminating the traversal of the BVH.

By doing so, non-limiting embodiments of the present technology could allow for more realistic renderings of 3D scenes by considering the content of each of the BVH nodes, still allowing saving a considerable amount of computational resources of the processor by optimizing a number of BVH nodes in the given 3D scene 400 to be traversed. Thus, the present methods and systems may allow improve the satisfaction of users appreciating the rendered 3D scenes.

More specifically, in accordance with a first broad aspect of the present technology, there is provided a method for traversing a bounding volume hierarchy (BVH) structure associated with a given 3D scene using a ray tracing algorithm. The BVH has a plurality of BVH nodes. A given BVH node is representative of a respective bounding volume containing a portion of mesh elements defining a surface of the given 3D scene. The method comprises: during a pre-processing phase: determining an escape probability value for the given BVH node of the BVH structure of a given ray, propagated during an execution of the ray tracing algorithm, traversing the given BVH node without reflecting off any mesh element contained therein. Further, during a rendering phase, following the pre-processing phase, the method comprises: propagating a ray in the given 3D scene, the ray intersecting the respective bounding volume of the given BVH node; determining whether the ray is to traverse or reflect off the respective bounding volume of the given BVH node using the escape probability value thereof; in response to determining that the ray is to reflect off the respective bounding volume: rendering a mesh element contained in the respective bounding volume of the given BVH node; in response to determining that the ray is to traverse the respective bounding volume, identifying an other given BVH node, which is intersected by the ray, the other given BVH node being representative of an other respective bounding volume contained in the respective bounding volume, the other given BVH node being associated with an other escape probability value; and determining whether the ray is to traverse or to reflect off the other respective bounding volume of the other given BVH node using the other escape probability value.

In some implementations of the method, the determining the escape probability value for the given BVH node comprises: propagating a plurality of training rays through the respective bounding volume of the given BVH node; determining a number of escape training rays that have traversed the respective bounding volume without reflecting off any mesh element therein; and determining the escape probability value for the given BVH node as being a ratio between the number of escape training rays and a total number of training rays having entered the respective bounding volume.

In some implementations of the method, the determining the escape probability value for the given BVH node comprises: determining respective escape probability values for terminal BVH nodes of the BVH structure; and averaging the respective escape probability values of child BVH nodes under the given BVH node.

In some implementations of the method, the plurality of training rays is diverging from a predetermined source disposed in the given 3D scene.

In some implementations of the method, the plurality of training rays includes rays that are parallel thereamong.

In some implementations of the method, the plurality of training rays includes rays that are equally spaced therebetween.

In some implementations of the method, the method further comprises storing the escape probability value in the BVH structure in association with the given BVH node.

In some implementations of the method, the determining the escape probability value for the given BVH node comprises determining a set of escape probability values for the given BVH node, determining a given one of the set of escape probability values being executed in a respective one of a plurality of predetermined traversing directions; and determining whether the ray is to traverse or reflect off the respective bounding volume of the given BVH node using the escape probability value thereof comprises using that one of the set of escape probability values which corresponds to a traversing direction of the ray.

In some implementations of the method, the propagating the ray in the given 3D scene comprises defining a view cone along the ray, the view cone having a predetermined cone angle and a predetermined base diameter; and the determining whether the ray is to traverse or reflect off the respective bounding volume of the given BVH node is executed in response to determining that the respective bounding volume is fully contained within the view cone defined around the ray.

In some implementations of the method, the determining that the ray is to traverse the respective bounding volume of the given BVH node comprises determining that the escape probability value is equal to or greater than a probability threshold value; and the determining that the ray is to reflect off the respective bounding volume of the given BVH node comprises determining that the escape probability value is lower than the probability threshold value.

In some implementations of the method, the probability threshold value has been randomly selected for the ray.

In some implementations of the method, the probability threshold value is predetermined.

In accordance with a second broad aspect of the present technology, there is provided a server for traversing a bounding volume hierarchy (BVH) structure associated with a given 3D scene using a ray tracing algorithm. The BVH has a plurality of BVH nodes. A given BVH node is representative of a respective bounding volume containing a portion of mesh elements defining a surface of the given 3D scene. The server comprises at least one processor and at least one non-transitory computer-readable memory storing executable instructions, which, when executed by the at least one processor, cause the server to: during a pre-processing phase: determine an escape probability value for the given BVH node of the BVH structure of a given ray, propagated during an execution of the ray tracing algorithm, traversing the given BVH node without reflecting off any mesh element contained therein; during a rendering phase, following the pre-processing phase: propagate a ray in the given 3D scene, the ray intersecting the respective bounding volume of the given BVH node; determine whether the ray is to traverse or reflect off the respective bounding volume of the given BVH node using the escape probability value thereof; in response to determining that the ray is to reflect off the respective bounding volume: render a mesh element contained in the respective bounding volume of the given BVH node; in response to determining that the ray is to traverse the respective bounding volume, identify an other given BVH node, which is intersected by the ray, the other given BVH node being representative of an other respective bounding volume contained in the respective bounding volume, the other given BVH node being associated with an other escape probability value; and determine whether the ray is to traverse or to reflect off the other respective bounding volume of the other given BVH node using the other escape probability value.

In some implementations of the server, to determine the escape probability value for the given BVH node comprises, the at least one processor causes the server to: propagate a plurality of training rays through the respective bounding volume of the given BVH node; determine a number of escape training rays that have traversed the respective bounding volume without reflecting off any mesh element therein; and determine the escape probability value for the given BVH node as being a ratio between the number of escape training rays and a total number of training rays having entered the respective bounding volume.

In some implementations of the server, to determine the escape probability value for the given BVH node, the at least one processor causes the server to: determine respective escape probability values for terminal BVH nodes of the BVH structure; and average the respective escape probability values of child BVH nodes under the given BVH node.

In some implementations of the server, the plurality of training rays is diverging from a predetermined source disposed in the given 3D scene.

In some implementations of the server, the plurality of training rays includes rays that are parallel thereamong.

In some implementations of the server, the plurality of training rays includes rays that are equally spaced therebetween.

In some implementations of the server, the at least one processor further causes the server to store the escape probability value in the BVH structure in association with the given BVH node.

In some implementations of the server, to determine the escape probability value for the given BVH node, the at least one processor causes the server to determine a set of escape probability values for the given BVH node, determining a given one of the set of escape probability values being executed in a respective one of a plurality of predetermined traversing directions; and to determine whether the ray is to traverse or reflect off the respective bounding volume of the given BVH node using the escape probability value thereof, the at least one processor causes the server to use that one of the set of escape probability values which corresponds to a traversing direction of the ray.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Computing Environment

Figure 1:
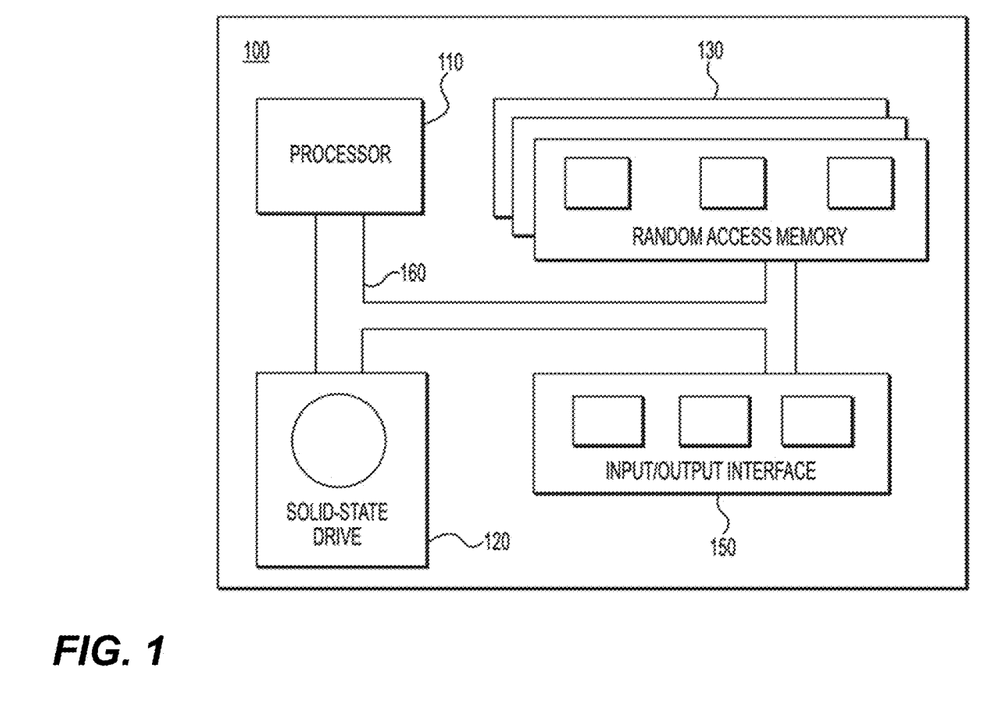
FIG. 1 shows an example of a computing device that may be used to implement any of the methods described herein.

FIG. 1 illustrates a diagram of a computing environment 100 in accordance with an embodiment of the present technology is shown. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random-access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random-access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

As mentioned hereinabove, various non-limiting embodiments of the present methods and system are directed to rendering 3D scenes by traversing a bounding volume hierarchy (BVH) using a ray tracing algorithm.

In the context of the present specification, the term a "ray tracing algorithm" denotes a rendering algorithm that generates a 2D image by extending rays into a given 3D scene (such as the given 3D scene 400 depicted in FIG. 4) and bouncing them off surfaces and towards sources of light to approximate respective color values of pixels. More specifically, as the light traverses the given 3D scene 400, it may reflect off one 3D object to another (causing reflections), be blocked by some 3D objects (causing shadows), or pass through transparent or semi-transparent 3D objects (causing refractions). All of these interactions are combined to produce the final color and illumination of a pixel that is then displayed on a screen, for example, of a user electronic device that has requested rendering the given 3D scene 400.

Further, in the context of the present specification, the term "BVH" denotes a ray tracing optimization technique that uses a tree-based structure that contains multiple hierarchically-arranged bounding volumes (such as axis-aligned bounding boxes, AABB) that encompass or surround a given number of scene geometry or primitives. These primitives may be triangular mesh elements defining surfaces of 3D objects in the given 3D scene 400. The BVH can be organized in different types of tree structures; and therefore, during the execution of the ray tracing algorithm, each ray needs to extend through the BVH using a depth-first tree traversal process instead of going through every primitive.

According to certain non-limiting embodiments of the present technology, the rendering of the given 3D scene 400 can include two consecutively executed phases: (1) a pre-processing phase where certain parameters of the BVH associated with the given 3D scenes are determined; and (2) a rendering phase per-se including rendering the given 3D scene 400 on the screen of the user electronic device, using the parameters determined during the pre-processing phase. Both the pre-processing and rendering phases will now be described.

Pre-Processing Phase

According to certain non-limiting embodiments of the present technology, the pre-processing phase can be executed by a server (not depicted) hosting image data, such as that indicative of the given 3D scene 400. In some non-limiting embodiments of the present technology, the server is implemented as a conventional computer server and may also comprise some or all of the components of the computing environment 100 of FIG. 1. In a specific non-limiting example, the server is implemented as a Dell™ PowerEdge™ Server running the Microsoft™ Windows Server™ operating system, but can also be implemented in any other suitable hardware, software, and/or firmware, or a combination thereof. In some non-limiting embodiments of the present technology, the server is a single server. In alternative non-limiting embodiments of the present technology, the functionality of the server may be distributed and may be implemented via multiple servers.

Thus, according to certain non-limiting embodiments of the present technology, during the execution of the pre-processing phase, the server can be configured to: (i) generate the BVH for the given 3D scene 400; and (ii) determine how nodes of the BVH should be traversed during the execution of the ray tracing algorithm in order to generate a respective rendered 3D image of the given 3D scene 400.

To that end, according to certain non-limiting embodiments of the present technology, the server can be configured to determine, for each node of the BVH, such as the given node 202 mentioned above with reference to FIG. 2, a respective escape probability value that a given ray, propagated during the execution of the ray tracing algorithm, will extend through the given node 202 without reflecting off any mesh elements therein.

Figure 5:
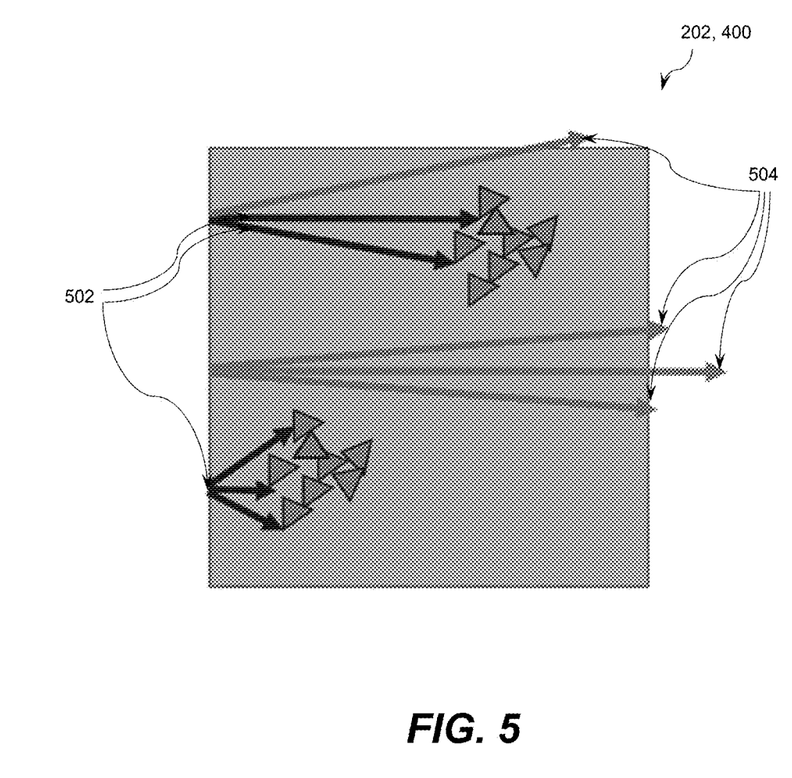
FIG. 5 shows a schematic diagram of determining an escape probability value for the given node of the BVH for further determining whether the given ray is to traverse or reflect off the given node while executing the ray tracing algorithm, in accordance with certain non-limiting embodiments of the present technology.

With reference to FIG. 5, there is depicted a schematic diagram of a step for determining, by the server, an escape probability value for the given node 202, in accordance with certain non-limiting embodiments of the present technology.

As it is best seen in FIG. 5, to determine the escape probability value for the give node 202 of the BVH associated with the given 3D scene 400, the server can be configured to: (i) propagate through the given 3D scene 400 a plurality of training rays; (ii) determine, for the given node 202, a total number of training rays that have entered the given node 202; and (iii) determine an escape number of training rays that have gone through the given node 202 without hitting any mesh element therein.

It is not limited how the server 202 can be configured to propagate the plurality of training rays through the given 3D scene 400. In some non-limiting embodiments of the present technology, the server can be configured to propagate the plurality of training rays from one or more predetermined light sources which can simulate one of user's views into the given 3D scene 400. For example, training rays diverging from a given predetermined light source can be equally spaced therebetween. In another example, the training rays propagated from the given predetermined light source can be spaced randomly.

In some non-limiting embodiments of the present technology, the server can be configured to propagate the training rays without using any light source. For example, the server can be configured to propagate the plurality of training rays along a plurality of traversing directions associated with the given 3D scene 400, along a respective 3D coordinate plane, such as one of left to right, back and fourth, top to bottom, and vice versa (in the orientation of FIG. 4). In some non-limiting embodiments of the present technology, the server can be configured to propagate the plurality of training rays such that they traverse though each side of the given node 202. In these embodiments, the server can be configured to propagate the plurality of training rays such that they are substantially parallel and extend uniformly along a given traversing direction of the plurality of traversing directions. However, in some non-limiting embodiments of the present technology, the server 202 can be configured to propagate the plurality of training rays in the given traversing direction such that they extend randomly along the given traversing direction.

Thus, in the example of FIG. 5, the server can be configured to determine that a first portion of training rays 502 has hit the mesh elements contained within the given node 202. Thus, each training ray of the first portion of training rays 502 will reflect off respective mesh elements and continue traversing the given 3D scene 400 in other directions. By contrast, the server can be configured to determine that a second portion of training rays 504 that has entered the given node 202 extends therethrough without bouncing off any mesh element contained in the given node 202. In other words, each training ray of the second portion of rays 504 is an escape training ray, which after traversing the given node 202 will continue traversing the BVH associated with the given 3D scene 400 in an original traversing direction, in which it was propagated.

Further, after determining how many escape training rays have gone through the given node 202, the server can be configured to determine the escape probability value for the given node 202. In some non-limiting embodiments of the present technology, the server can be configured to determine the escape probability value as a ration between (1) the number of escape training rays, that is, a number of training rays in the second portion of training rays 504, which in the current example is 4, and (2) the total number of training rays that have entered the given node 202, which in the current example is 9. In other words, the server can be configured to determine the escape probability value according to a following equation:

$$P_l(i) = \frac{\# \text{ escaped rays}}{\text{total rays}} = \frac{4}{9} = 0.44 \quad (1)$$

In some non-limiting embodiments of the present technology, instead of a single escape probability value, the server can be configured to determine a respective escape probability value for each traversing direction of the plurality of training rays, as explained above, thereby generating a set of escape probabilities associated with the given node 202.

In some non-limiting embodiments of the present technology, where the given node 202 is not a leaf (or otherwise terminal) node of the BVH, the server can be configured to determine the escape probability value for the given node 202 is an average value of respective probability values of child nodes disposed under the given node 202 in the BVH.

Further, the server can be configured to store, for each node of the BVH associated with the given 3D scene 400, a respective escape probability value (or a respective set thereof) for further use in rendering the given 3D scene in an internal memory of the server-such as solid-state drive 120. How the respective escape probability values associated with the nodes of the BVH are used during the rendering of the given 3D scene 400 will now be described.

Rendering Phase

In some non-limiting embodiments of the present technology, the rendering phase can be executed by the server that executed the pre-processing phase. In other non-limiting embodiments of the present technology, the rendering phase can be executed by an electronic device (not depicted) which is in communication (via a communication network, such as the Internet) and has requested to provide image data of the given 3D scene 400 for rendering.

In some non-limiting embodiments of the present technology, the electronic device may be any computer hardware that is capable of running a software appropriate to the relevant task at hand. In this regard, the electronic device can comprise some or all of the components of the computing environment 100 of FIG. 1. Some non-limiting examples of the electronic device may include personal computers (desktops, laptops, netbooks, etc.), smartphones, and tablets.

According to certain non-limiting embodiments of the present technology, the electronic device can be configured to receive the data indicative of the given 3D scene 400 including those of the BVH and the respective escape probability values associated with the nodes of the BVH. Further, the electronic device can be configured to execute the ray tracing algorithm by propagating rays through the given 3D scene 400 and determining whether the given ray is to traverse or reflect off the given node 202 of the BVH.

To do so, in some non-limiting embodiments of the present technology, the electronic device can be configured to determine whether the escape probability value associated with the given node 202 is one of equal to or greater and lower than a probability threshold value. In some non-limiting embodiments of the present technology, the probability threshold value can be predetermined and comprise, for example, one of 0.75, 0.8, or 0.9. In other non-limiting embodiments of the present technology, the probability threshold value can be selected randomly.

More specifically, in response to determining that the escape probability value is equal to or greater than the probability threshold value, the electronic device can be configured to propagate the given ray through the given node 202 without rendering any mesh element contained within an associated bounding volume thereof. More specifically, if the escape probability value of the given node 202 is equal to or greater than the probability threshold value, the electronic device can be configured to cause the propagation of the given ray in the same direction further to other nodes of the BVH, such as one of child nodes of the given node 202. By comparing the respective probability values associated with the other nodes of the BVH to the probability threshold value, the electronic device can similarly be configured to determine whether the given ray is to traverse or reflect off one of the other nodes.

However, if the electronic device determines that the escape probability value is lower than the probability threshold value, the electronic device can be configured to: (i) render at least one mesh element contained within the associated bounding volume of the given node 202; and (ii) cause the given ray to reflect off the given node 202 to continue traversing the BVH in another direction.

In those embodiments where the escape probability value of the given node 202 comprises the set of escape probability values, each one of which has been determined for a respective traversing direction of the plurality of training rays through the given node 202, the electronic device can be configured to compare, to the probability threshold, that escape probability value from the set of probability values which corresponds to the traversing direction of the given ray. In other words, to determine whether the given ray is to traverse or reflect off the given node 202, in these embodiments, the electronic device can be configured to use the escape probability value associated with that side of the associated bounding volume of the given node 202, through which the given ray is to enter the given node 202.

How the electronic device can be configured to select the at least one mesh element within the associated bounding volume of the given node 202 for rendering is not limited and can include, for example, one of: (1) randomly sampling a predetermined number (such as 1, 5, 26, or 112) of mesh elements to be rendered; and (2) uniformly sampling the predetermined number of mesh elements.

In some non-limiting embodiments of the present technology, the electronic device can be configured to execute the ray tracing algorithm by combining both the approach of using the escape probability value described immediately above and the view cone heuristic approach described above with reference to FIG. 2. In other words, in these embodiments, the electronic device can be configured to determine whether the given ray is to traverse or reflect off the given node 202 based on the escape probability value associated therewith only if the given node 202 is fully contained within the view cone 206. Else, notwithstanding the escape probability value, the electronic device may cause the given ray to continue traversing the given 3D scene 400 in the original traversing direction, that is, the other nodes of the BVH intersected by the given ray, such as one of child nodes of the given node 202.

Thus, certain non-limiting embodiments of the present technology may allow considering not only the shape and dimensions of the given node 202 of the BVH associated with the given 3D scene 400 but also a content of the given node 202, that is, a number and distribution of the mesh elements contained therein. This, in turn, can allow for a more accurate rendering of the given 3D scene 400. For example, the rendering approaches described above may allow more accurately render indirect light in the given 3D scene 400, which can result in a more realistic rendered 3D image thereof.

Computer-Implemented Method

Figure 6:
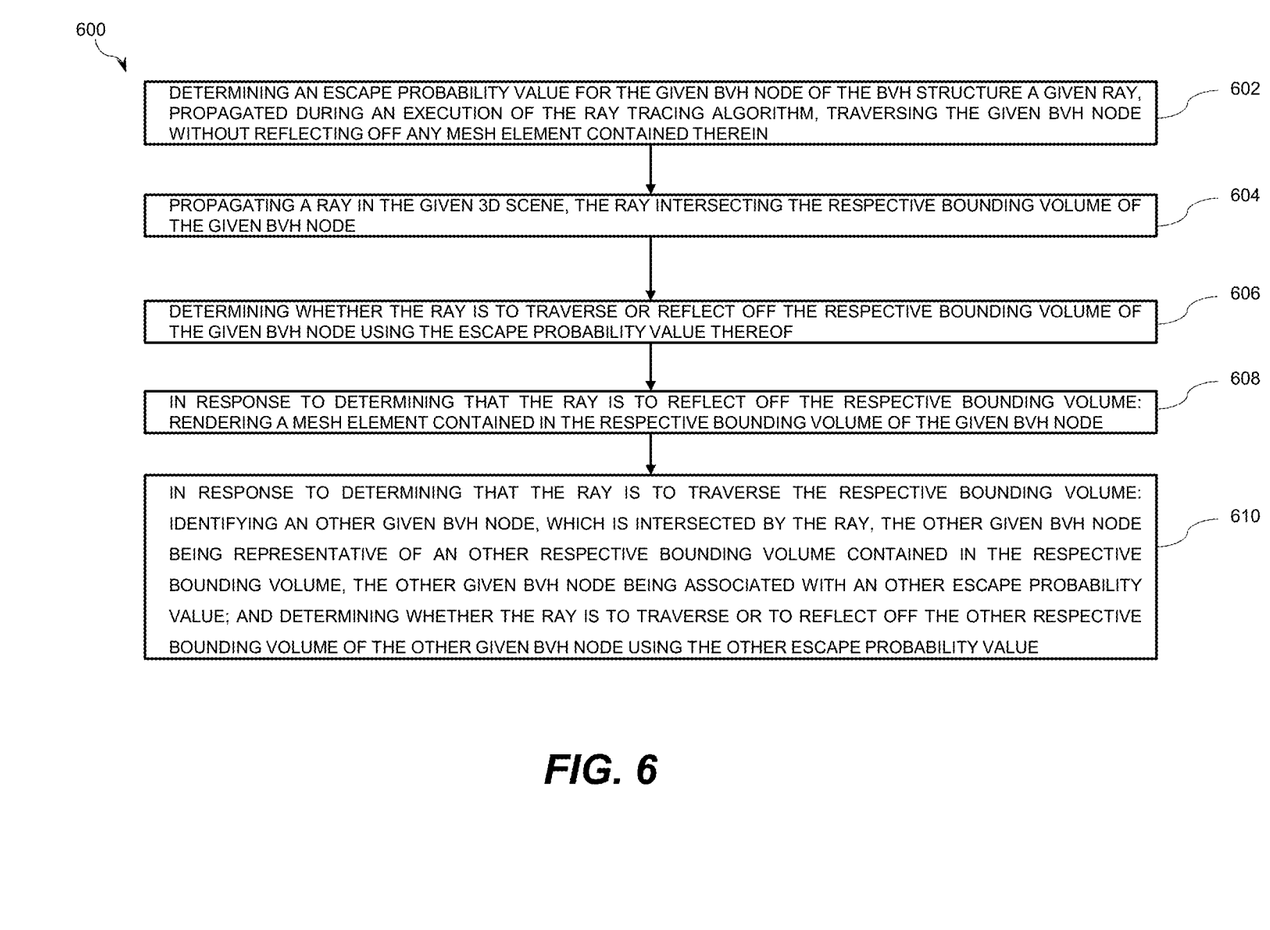
FIG. 6 shows a flowchart diagram of a method for traversing the BVH of the given 3D scene using the ray tracing algorithm, in accordance with certain non-limiting embodiments of the present technology.

Given the architecture and examples described above, it is now possible to execute a method of traversing a BVH structure, such as that associated with the given 3D scene 400, using the ray tracing algorithm. With reference to FIG. 6, there is depicted a scheme-block representation of a method 600. The method 600 can be executed by one of the server and the electronic device. In some non-limiting embodiments of the present technology, some steps of the method 600, such as those of the pre-processing phase, can be executed by the server; while others, such as those of the rendering phase, can be executed by the electronic device.

Step 602: Determining an Escape Probability Value for the Given BVH Node of the BVH Structure a Given Ray, Propagated During an Execution of the Ray Tracing Algorithm, Traversing the Given BVH Node without Reflecting Off any Mesh Element Contained Therein At step 602, according to certain non-limiting embodiments of the present technology, the server can be configured to execute the pre-processing phase of the rendering of the given 3D scene 400. More specifically, to do so, first, the server can be configured to generate, for the given 3D scene 400, the BVH including a plurality of nodes, such as the given node 202 schematically depicted in FIG. 2.

Further, as described in detail above with reference to FIG. 5, the server 202 can be configured to determine for the given node 202 the escape probability value that the given ray, during the execution of the ray tracing algorithm, would traverse the associated bounding volume of the given node 202. More specifically, the server can be configured to determine the escape probability value for the given node in accordance with Equation (1) above.

In some non-limiting embodiments of the present technology, instead of determining the single escape probability value, the server can be configured to determine the set of escape probability values for a plurality of predetermined traversing directions of the plurality of training rays through the given 3D scene 400.

The method 600 hence advances to step 604.

Step 604: Propagating a Ray in the Given 3D Scene, the Ray Intersecting the Respective Bounding Volume of the Given BVH Node At step 604, according to certain non-limiting embodiments of the present technology, the electronic device can be configured to execute the rendering phase of the rendering of the given 3D scene. To do so, the electronic device can be configured to request the server to transmit the image data associated with the given 3D scene 400 including the BVH associated therewith with the respective escape probabilities of each of the nodes of the BVH.

Further, to render the given 3D scene 400, the electronic device can be configured to execute the ray tracing algorithm by propagating a plurality of rays through the given 3D scene 400.

The method 600 hence advances to step 606.

Step 606: Determining Whether the Ray is to Traverse or Reflect Off the Respective Bounding Volume of the Given BVH Node Using the Escape Probability Value Thereof At step 606, the electronic device can be configured to determine whether the given ray is traverse or reflect off the associated bounding volume of the given node 202. To that end, in some non-limiting embodiments of the present technology, the electronic device can be configured to compare the escape probability value associated with the given node 202 with the probability threshold.

In those embodiments where the escape probability value of the given node 202 comprises the set of escape probability values, each one of which has been determined for the respective predetermined traversing direction of the plurality of training rays through the given node 202, the electronic device can be configured to compare, to the probability threshold, that escape probability value from the set of probability values which corresponds to the traversing direction of the given ray. In other words, to determine whether the given ray is to traverse or reflect off the given node 202, in these embodiments, the electronic device can be configured to use the escape probability value associated with that side of the associated bounding volume of the given node 202, through which the given ray is to enter the associated bounding volume of the given node 202.

The method 600 hence advances to step 608.

Step 608: In Response to Determining that the Ray is to Reflect Off the Respective Bounding Volume: Rendering a Mesh Element Contained in the Respective Bounding Volume of the Given BVH Node At step 608, if the electronic device determines that the escape probability value is lower than the probability threshold value, the electronic device can be configured to: (i) determine that the given ray is to reflect off the associated bounding volume of the given node 202; (ii) render at least one mesh element contained within the associated bounding volume of the given node 202; and (iii) cause the given ray to continue traversing the BVH in another direction.

The method 600 hence advances to step 610.

Step 610: In Response to Determining that the Ray is to Traverse the Respective Bounding Volume: Identifying an Other Given BVH Node, which is Intersected by the Ray, the Other Given BVH Node being Representative of an Other Respective Bounding Volume Contained in the Respective Bounding Volume, the Other Given BVH Node being Associated with an Other Escape Probability Value; and Determining Whether the Ray is to Traverse or to Reflect Off the Other Respective Bounding Volume of the Other Given BVH Node Using the Other Escape Probability Value At step 610, in response to determining that the escape probability value of the given node 202 is equal to or greater than the probability threshold value, the electronic device can be configured to determine that the given ray is to traverse the associated bounding volume of the given node 202. In this case, the electronic device can be configured to propagate the given ray through the given node 202 without rendering any mesh element contained within the associated bounding volume thereof. More specifically, if the escape probability value of the given node 202 is equal to or greater than the probability threshold value, the electronic device can be configured to determine, in a similar manner, whether the given ray is to traverse of reflect off other nodes of the BVH located on a propagation path of the give ray.

The method 600 hence terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for traversing a bounding volume hierarchy (BVH) structure associated with a given 3D scene using a ray tracing algorithm, the BVH having a plurality of BVH nodes, a given BVH node being representative of a respective bounding volume containing a portion of mesh elements defining a surface of the given 3D scene, the method comprising:

during a pre-processing phase:
  determining an escape probability value for the given BVH node of the BVH structure of a given ray, propagated during an execution of the ray tracing algorithm, traversing the given BVH node without reflecting off any mesh element contained therein;
during a rendering phase, following the pre-processing phase:
  propagating a ray in the given 3D scene, the ray intersecting the respective bounding volume of the given BVH node;
  determining whether the ray is to traverse or reflect off the respective bounding volume of the given BVH node using the escape probability value thereof;
  in response to determining that the ray is to reflect off the respective bounding volume:
    rendering a mesh element contained in the respective bounding volume of the given BVH node;
  in response to determining that the ray is to traverse the respective bounding volume,
    identifying another given BVH node, which is intersected by the ray, the another given BVH node being representative of another respective bounding volume contained in the respective bounding volume, the another given BVH node being associated with another escape probability value; and
    determining whether the ray is to traverse or to reflect off the another respective bounding volume of the another given BVH node using the another other escape probability value.

2. The method of claim 1, wherein the determining the escape probability value for the given BVH node comprises:
  propagating a plurality of training rays through the respective bounding volume of the given BVH node;
  determining a number of escape training rays that have traversed the respective bounding volume without reflecting off any mesh element therein; and
  determining the escape probability value for the given BVH node as being a ratio between the number of escape training rays and a total number of training rays having entered the respective bounding volume.

3. The method of claim 2, wherein the determining the escape probability value for the given BVH node comprises:
  determining respective escape probability values for terminal BVH nodes of the BVH structure; and
  averaging the respective escape probability values of child BVH nodes under the given BVH node.

4. The method of claim 2, wherein the plurality of training rays is diverging from a predetermined source disposed in the given 3D scene.

5. The method of claim 2, wherein the plurality of training rays includes rays that are parallel thereamong.

6. The method of claim 2, wherein the plurality of training rays includes rays that are equally spaced therebetween.

7. The method of claim 2, further comprising storing the escape probability value in the BVH structure in association with the given BVH node.

8. The method of claim 1, wherein:
the determining the escape probability value for the given BVH node comprises determining a set of escape probability values for the given BVH node, determining a given one of the set of escape probability values being executed in a respective one of a plurality of predetermined traversing directions; and
determining whether the ray is to traverse or reflect off the respective bounding volume of the given BVH node using the escape probability value thereof comprises using that one of the set of escape probability values which corresponds to a traversing direction of the ray.

9. The method of claim 1, wherein:
the propagating the ray in the given 3D scene comprises defining a view cone along the ray, the view cone having a predetermined cone angle and a predetermined base diameter; and
the determining whether the ray is to traverse or reflect off the respective bounding volume of the given BVH node is executed in response to determining that the respective bounding volume is fully contained within the view cone defined around the ray.

10. The method of claim 1, wherein:
the determining that the ray is to traverse the respective bounding volume of the given BVH node comprises determining that the escape probability value is equal to or greater than a probability threshold value; and
the determining that the ray is to reflect off the respective bounding volume of the given BVH node comprises determining that the escape probability value is lower than the probability threshold value.

11. The method of claim 10, wherein the probability threshold value has been randomly selected for the ray.

12. The method of claim 10, wherein the probability threshold value is predetermined.

13. A server for traversing a bounding volume hierarchy (BVH) structure associated with a given 3D scene using a ray tracing algorithm, the BVH having a plurality of BVH nodes, a given BVH node being representative of a respective bounding volume containing a portion of mesh elements defining a surface of the given 3D scene,
the server comprising at least one processor and at least one non-transitory computer-readable memory storing executable instructions, which, when executed by the at least one processor, cause the server to:
during a pre-processing phase:
  determine an escape probability value for the given BVH node of the BVH structure of a given ray, propagated during an execution of the ray tracing algorithm, traversing the given BVH node without reflecting off any mesh element contained therein;
during a rendering phase, following the pre-processing phase:
  propagate a ray in the given 3D scene, the ray intersecting the respective bounding volume of the given BVH node;
  determine whether the ray is to traverse or reflect off the respective bounding volume of the given BVH node using the escape probability value thereof;
  in response to determining that the ray is to reflect off the respective bounding volume:
    render a mesh element contained in the respective bounding volume of the given BVH node;
  in response to determining that the ray is to traverse the respective bounding volume,
    identify another given BVH node, which is intersected by the ray, the another given BVH node being representative of another an respective bounding volume contained in the respective bounding volume, the another given BVH node being associated with another escape probability value; and determine whether the ray is to traverse or to reflect off the another respective bounding volume of the another given BVH node using the another escape probability value.

14. The server of claim 13, wherein to determine the escape probability value for the given BVH node comprises, the at least one processor causes the server to:
propagate a plurality of training rays through the respective bounding volume of the given BVH node;
determine a number of escape training rays that have traversed the respective bounding volume without reflecting off any mesh element therein; and
determine the escape probability value for the given BVH node as being a ratio between the number of escape training rays and a total number of training rays having entered the respective bounding volume.

15. The server of claim 14, wherein to determine the escape probability value for the given BVH node, the at least one processor causes the server to:
determine respective escape probability values for terminal BVH nodes of the BVH structure; and
average the respective escape probability values of child BVH nodes under the given BVH node.

16. The server of claim 14, wherein the plurality of training rays is diverging from a predetermined source disposed in the given 3D scene.

17. The server of claim 14, wherein the plurality of training rays includes rays that are parallel thereamong.

18. The server of claim 14, wherein the plurality of training rays includes rays that are equally spaced therebetween.

19. The server of claim 14, wherein the at least one processor further causes the server to store the escape probability value in the BVH structure in association with the given BVH node.

20. The server of claim 13, wherein:
to determine the escape probability value for the given BVH node, the at least one processor causes the server to determine a set of escape probability values for the given BVH node, determining a given one of the set of escape probability values being executed in a respective one of a plurality of predetermined traversing directions; and
to determine whether the ray is to traverse or reflect off the respective bounding volume of the given BVH node using the escape probability value thereof, the at least one processor causes the server to use that one of the set of escape probability values which corresponds to a traversing direction of the ray.

\* \* \* \* \*